Dec. 11, 1962   R. D. BRUNSON   3,067,604
APPARATUS FOR TESTING HEAT RESPONSIVE DEVICES
Filed Oct. 7, 1960   2 Sheets-Sheet 1
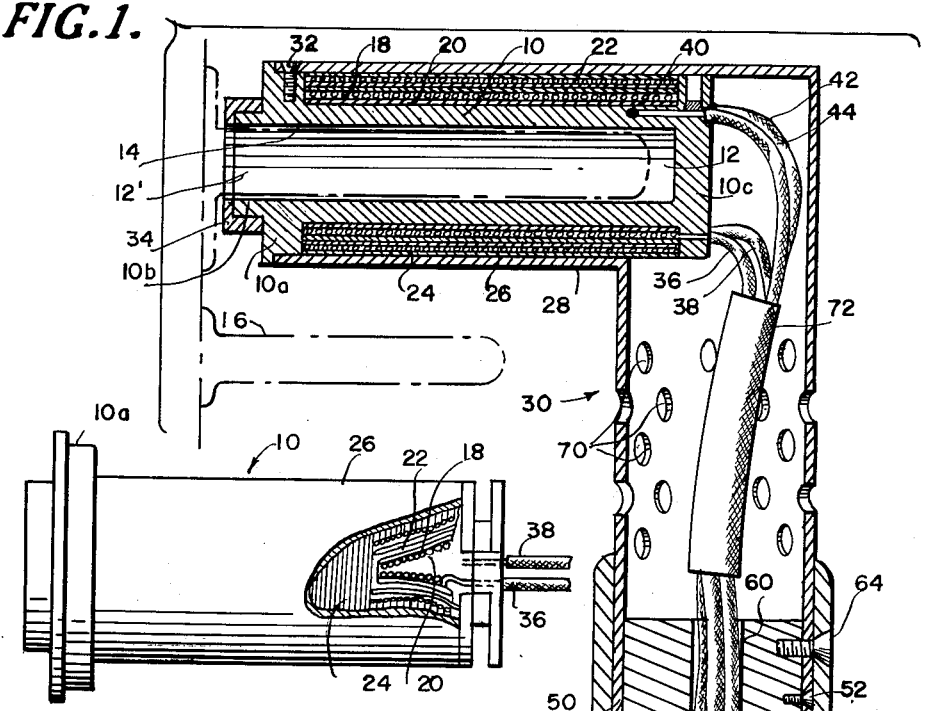
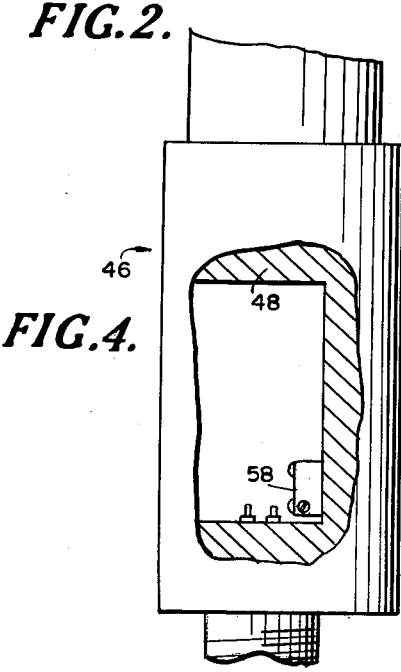
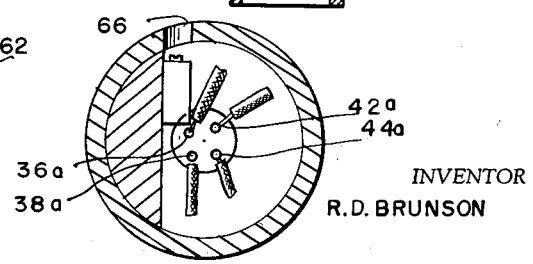
INVENTOR
R.D. BRUNSON
BY Cushman, Darby + Cushman
ATTORNEY Dec. 11, 1962  R. D. BRUNSON  3,067,604
APPARATUS FOR TESTING HEAT RESPONSIVE DEVICES
Filed Oct. 7, 1960  2 Sheets-Sheet 2

INVENTOR
R. D. BRUNSON

BY Cushman, Darby & Cushman
ATTORNEY

United States Patent Office 3,067,604
Patented Dec. 11, 1962

3,067,604
APPARATUS FOR TESTING HEAT
RESPONSIVE DEVICES
Raymond D. Brunson, Fort Worth, Tex., assignor to
Howell Instruments, Inc., a corporation of Texas
Filed Oct. 7, 1960, Ser. No. 61,257
4 Claims. (Cl. 73—1)

This invention pertains to apparatus for testing heat responsive units, and particularly relates to such apparatus for testing heat responsive units of differing designs and characteristics.

In many arts it is now common to have several heat responsive devices or units in use. In aircraft, many so-called thermal switches are used to detect and indicate fires. In gas turbine aircraft engines, there are thermocouples in the tail cones for reporting operating temperatures, which are very critical. In chemical processes, temperature must be detected at various points to afford control over the process. In these and many other cases, the heat detecting units are permanently mounted and wired to indicating equipment, and it is not desired to remove them for testing. It may be stated moreover that these units are structures which protrude as a finger or post from a supporting surface.

Confronted with the problem of how such units could be readily tested in situ, J. S. Howell in U.S. Patent No. 2,854,844 described a novel testing apparatus characterized by what may be conveniently termed a portable probe having a cavity or chamber into which the unit to be tested could be inserted. A heating means was provided in the probe, and also a local heat detecting means, whereby the output of the local heat detecting means in the probe could be compared to the indicating equipment permanently wired to the unit under test. This produced a revolution in the testing of thermocouple in jet engines, inasmuch as it was no longer necessary to either remove the thermocouples or to run-up the engine to make a test.

In accordance with the present invention, it has been discovered that selective attenuation of the signal from the heat detecting electrical means in the probe permits use of a given probe with a variety of different designs of units to be tested. That is, with a chamber of given dimensions in a probe, particular heat gradients will exist with a given unit in place, and the heat being supplied to the unit under test will have a certain relation to the heat supplied to the local heat detecting means. A different unit under test, say a smaller and shorter one, will have a different amount of heat supplied to it, or absorbed by it, and a reading from its permanent indicating equipment will have a different relationship to the output of the local heat detecting means. However, by the present invention it is discovered that if the signal from the local heat detecting means is attenuated or modified for the distinct unit under discussion, then a correspondence between the local temperature reading and the units own reading may be re-established.

It is therefore a primary object of this invention to provide an apparatus for testing a range of designs of heat sensitive units.

Other objects and the entire scope of the invention will become apparent from the following detailed description and from the appended claims. The illustrative embodiment may be best understood with reference to the accompanying drawings, wherein:

FIGURE 1 is a cross-sectional view of a complete probe portion of structure embodying the present invention.

FIGURE 2 shows an enlargement of a portion of the structure of FIGURE 1, partially in section.

FIGURE 4 is a view partially in section of the handle portion of the probe shown in FIGURE 1.

FIGURE 5 is a cross-sectional view taken substantially along the line 5—5 of FIGURE 3.

Figure 3:
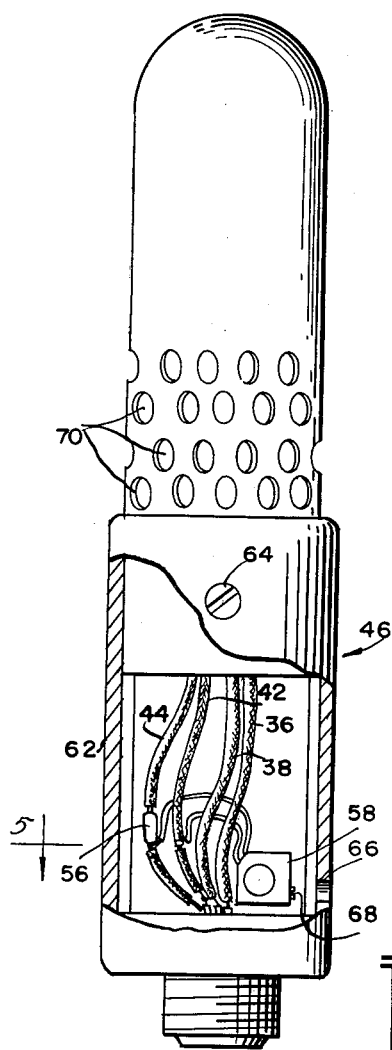
FIGURE 3 is a side view partially in section taken from the right-hand side of FIGURE 1.

The illustrative embodiment as shown in the drawings comprises a means 10, preferably a cylindrical tube of copper, for defining a chamber 12 open at one end 12' into which may be inserted a heat responsive unit to be tested. The exterior contour of an exemplary unit to be tested is shown inserted into the chamber in FIGURE 1, this aforesaid exterior contour being outlined by chain line 14, and the reference character 14 may be taken to designate the first type of heat responsive unit to be tested. Similarly, reference character 16 shows a second type of heat responsive unit which may be tested, this of different physical size, to wit, shorter and of lesser diameter. As this explanation proceeds, it will become apparent how the heat responsive unit 16 could be in the chamber 12 to replace the heat responsive unit 14, and nevertheless a suitable test carried out.

The illustrative embodiment is further characterized by a winding of electrical resistance wire 18 wound about a layer of insulation 20 such as mica which, in turn is laid about the exterior surface of the member 10 which defines the chamber 12. To the outside of the winding 18 may be an additional layer or layers of mica insulation 22, and these may be surrounded by a tight wrap of heat resistant wire 24, simply for firmly binding the winding 18 and the said layers of insulation upon the exterior of the member 10. To the exterior of the binding wire 24 may be placed an additional layer 26 of insulating material. The assembly as thus far described is then contained within a portion 28 of a housing generally designated by reference character 30. The member 10 which defines the chamber 12 may have an enlarged portion 10a at its outer end for receiving the end of the housing section 28 and for assembly purposes these two parts may be joined as by a screw or screws 32. The extreme end 10b of the member 10 may have a cap 34 thereon of steel, to protect the end 10b of the chamber defining member 10 when the latter is of copper and therefore relatively soft.

At the opposite end of the member 10, designated 10c for convenience, two insulated conductors 36 and 38 are provided for connection to the ends of the heating wire 18. for passing electrical heating current therethrough.

Thermally coupled to the chamber defining means 10, near the closed end of the chamber 12, is a thermocouple junction 40 between two thermocouple wires of differing material, designated 42 and 44 (shown insulated to the exterior of the member 10). The thermocouple junction 40 may be an ordinary junction formed by butt welding the two dissimilar conductors 42 and 44 with the junction 40 firmly staked or otherwise fastened in the member 10. As an alternative, the ends of the dissimilar conductors 42 and 44 may be electrically connected to the material of member 10 at spaced apart points, to form a so-called "third law" thermocouple junction. Both types of thermocouple junctions are fully described in the aforesaid Patent 2,854,844.

The housing 30 proceeds to a second portion designated generally by reference character 46. This is formed by a cylindrical block 48 of suitable material, preferably insulating material, which may be fitted into the end 50 of the metallic portion of the housing 30 which extends to the other section 28. A screw 52 may be employed for securing the parts 48 and 50 together. The member 48 is cut away to provide a chamber 54 for the purpose of housing a fixed resistor 56 and an adjustable resistor 58, the purpose of these to be developed hereinafter. The housing 48 is further provided with an aperture 60 through which the conductors 36, 38, 42 and 44 may pass into the chamber 54. The heating conductors 36 and 38 pass through chamber 54 and are attached to two pins 36a and 38a of a bayonet type connector. One remaining pin of the four pin connector is designated 42a and this is connected to the conductor 42 which extends directly through chamber 54 to said pin 42a. Conductor 44 passes through chamber 54 to pin 44a, but is interrupted by the fixed resistor 56. Within the chamber 54 the adjustable resistor 58 is connected in shunt across the conductors 42 and 44 beyond the fixed resistor 56, see the schematic circuit diagram in FIGURE 6. The section 46 of the housing 30 is closed by a sleeve 62 which may be joined with the parts 48 and 50 by one or more additional screws 64. It will be observed that this assemblage of parts provides a convenient handle for the overall probe structure, for grasping by the hand of the user. The cover of sleeve 62 may be provided with an aperture 66 (FIGS. 3 and 5) for providing access for a screw driver or other tool intended to adjust the adjustable resistor 58, by manipulation of whatever adjustment screw or the like 68 is provided for the purpose (see FIG. 5).

The section of the housing intervening between the heated section 28 and the handle section 46 is provided with a plurality of apertures 70. These serve to reduce the cross-sectional area of the housing which otherwise would conduct heat, and these apertures also permit the free circulation of air through this intermediate section of the housing, all for the purpose of preventing the handle section 46 of the housing from increasing in temperature appreciably above the surrounding ambient atmosphere. Reference character 72 designates convenient sleeving which may be employed for maintaining the respective conductors in a reasonably sized package as they pass from one section of the housing to the other.

FIGURE 2 is a somewhat enlarged view of the heat conductive member 10 shown in FIGURE 1, partly in section to show the insulating layer 26, the binding wire wrap 24, the insulating wraps 22, the heat winding 18 and the innermost insulating layer 20. The heating conductors 36 and 38 are also shown.

Figure 6:
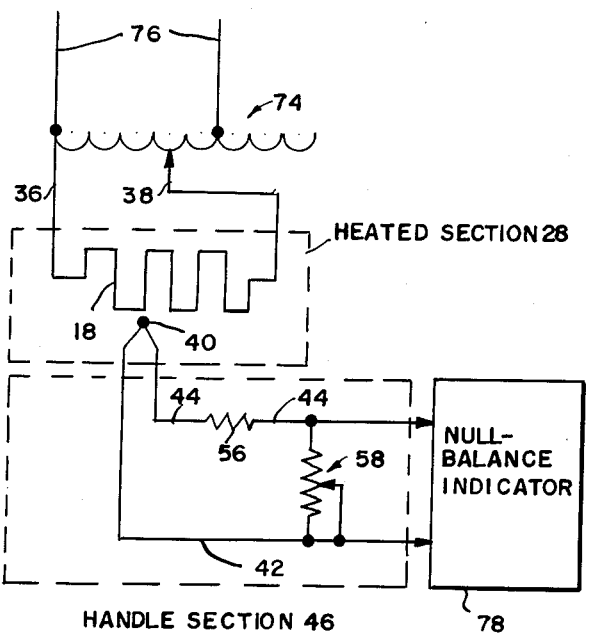
FIGURE 6 is a schematic diagram of an electrical circuit employed in the invention.

The complete electrical circuit is shown in FIGURE 6. First to be observed are the electrical heating winding 18 and the local heat detecting means, the thermocouple 40, within the section 28 of the probe housing. Further observed are the fixed resistance 56 and the adjustable resistance 58 connected to and into the conductors 42 and 44 respectively, as above described, within the handle section 46 of the probe. Also shown in FIGURE 6, but not in the other figures, is an auto-transformer designated generally as 74, the primary of which is connected to an alternating current supply line 76 and the secondary connected to the aforementioned heating conductors 36 and 38 which lead to the heating winding 18. Further shown in FIGURE 6, but not the other figures, is a device such as a null-balance indicator 78 for providing a reading of temperature to which the hot thermocouple junction 40 is subjected.

As is well known in the thermocouple art, the output of a theromocouple circuit is a function of the difference in temperature between the hot junction and the cold junction. In the herein illustrative embodiment, the hot junction is thermally coupled to the heat conductive member 10 which defines the testing chamber 12. The cold junction will be identified primarily with the point where the variable resistor 58 parallels or shunts the thermocouple wires 42 and 44. In an ideal case this cold junction should be located at a place where it can be positively protected from temperature changes. As a matter of practical convenience, however, it is desired to have the cold junction in the probe structure. In accordance with the present invention it has been found that by having the cold junction circuitry within the handle section 46 of the probe and with the apertures 70 located at a place intervening between this handle section and the heated section 28 of the probe, the temperature of the cold junction can be very reasonably controlled, and not influenced by the heat imparted to the section 28 by the heating winding 18.

Figure 7:
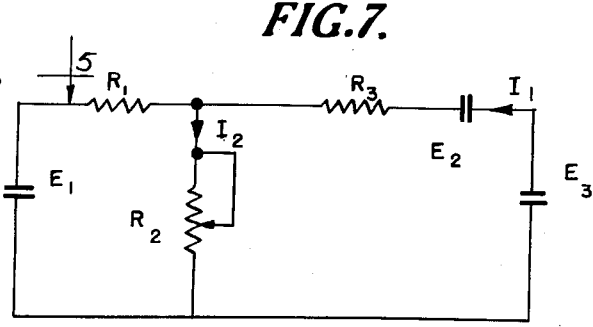
FIGURE 7 is an equivalent circuit of an electrical circuit used in the invention.

The electrical circuitry may be further understood by reference to FIGURE 7, which shows an equivalent electrical circuit. In this circuit E represents the E.M.F. resulting from the difference in temperature between the thermocouple hot junction and the temperature where the variable resistance 58 parallels or shunts the thermocouple hot junction. $R_1$ is the total loop resistance from the points of paralleling of the variable resistance through the thermocouple. $R_2$ is the resistance of the variable resistor 58. $R_3$ is the total loop resistance from the points of paralleling or shunting the variable resistance 58 on through the measuring instrument 78. $E_2$ is the E.M.F. resulting from the difference in temperature between the measuring instrument and the place where the variable resistance 58 shunts or parallels the thermocouple. $E_3$ is the back E.M.F. of the measuring instrument 78. Therefore the equation for the measured output E.M.F. is:

$$E_3 = \frac{R_2}{R_1+R_2}(E_1-E_2), \text{ where } I_1=0$$

For all practical purposes, $E_2$ will be equal to 0. Accordingly, the temperature differential between the point where the variable resistance shunts the thermocouple leads and the temperature at the measuring instrument 78 can be taken as 0. Therefore, the only error remaining would be due to changes in ambient temperature, which can be accounted for under all conditions of use. Of course, the value $E_2$ also may be accounted for if it cannot be ignored.

For an analysis of operation, let it be supposed that the unit 14 to be tested is a thermal switch designed to open or to close a circuit connected thereto at a given temperaure to which the unit is raised due to exposure to certain conditions of heat surrounding it. To use the probe, one will first take a thermal switch of this design but known to be properly operative and this known switch is first placed in the chamber 12. The variable voltage means 74 (FIG. 6) is then adjusted to regulate the current through the heating winding 18 so as to bring the temperature of the calibrated unit 14 within the chamber 12 to its point of operation (opening or closing its contacts). Under these conditions the variable resistance 58 is adjusted until a temperature reading is obtained upon the null-balance indicator device 78 which corresponds to the temperature value at which the calibrated thermal switch within the chamber 12 is intended to (and does) operate. Next, the calibrated unit is removed from the chamber 12, and a unit of the same design (but not known if in adjustment) is inserted into the chamber 12 to occupy the same position therein as was occupied by the calibrated unit. The variable voltage device 74 is now adjusted until the thermal switch under test operates. At the moment of operation the temperature read upon the null-balance indicator device 78 is noted. If this temperature reading does not correspond to the reading obtained when the calibrated unit operated, the user is thereby informed if the unit under test is out of adjustment, and to what extent.

It will now be appreciated that by using exactly the same testing apparatus, one can test other varieties of heat responsive units of different characteristics, such as the one illustrated and designated by reference character 16. Due to a different physical size as far as exterior surfaces are concerned, or perhaps due to different internal structure regardless of exterior surface configuration, the next type of unit to be tested may absorb heat differently from the winding 18 and the tube 10 and there will be a different correlation between the output of the hot thermocouple junction 40 and the equipment permanently connected with the unit under test. However, by the same procedure of first inserting a calibrated one of the unit design, followed by ones of unknown operability, malfunctioning of the latter may be readily detected.

From the foregoing it will be apparent that by selective modification of the signal proceeding from the local heat detecting means within the probe to the probe indicating equipment 78, a given probe structure can be employed for testing various designs of heat responsive units, such as thermal switches and thermocouples. If it be a thermocouple which is the unit under test, rather than a thermal switch, a particular output reading of the thermocouple unit under test can be compared to the output reading of the indicator 78, in the same manner as a thermal switch can be evaluated by noting the point of operation of contacts therein. It will be seen that in the illustrative embodiment, the signal from the local heat detecting means in the probe to the indicator 78 is modified by altering the tap in a voltage divider circuit. However, in the appended claims reference is made to the modification of the signal, inasmuch as other means for adjusting the effective output of the local heat detecting means will be apparent to those of skill in the art, and are within the scope of this invention.

It will be understood that where the equipment to be tested by a given user includes several different types and designs of heat responsive units, the user in his shop may first place calibrated ones of each design of unit, known to be properly operative to test as aforesaid into the probe chamber 12, and the setting of the variable resistor 58 noted. In the field, the operator when encountering a given design of unit may then simply set the variable resistance 58 to the previously noted value, and proceed to test other units of that design. It should be appreciated that this procedure permits the testing of various designs in the field simply by properly setting the variable resistance 58 for each different design of unit. The test is thus carried out irrespective of the particular voltage of the heating supply line 76, or the particular setting of the adjustable voltage means 74. In the field, the voltage and setting just referred to may be difficult to regulate and control, but in accordance with the present invention such problems are completely obviated.

In general, no limitation is necessary or intended to the details of the illustrative embodiment, and the true scope of the invention is to be determined from the appended claims.

What is claimed is:

1. Apparatus for testing a heat responsive unit comprising, means defining a chamber for receiving thereinto the unit to be tested, means for imparting heat to said chamber defining means for heating the unit therein, means thermally coupled with said chamber defining means for generating an electrical signal a characteristic of which is a function of the temperature of said chamber defining means, means coupled to said signal generating means for measuring said signal, the last mentioned means including means for selectively modifying the magnitude of said signal as received from said generating means and before coupling into said measuring means, the arrangement being such that for respective units under test of differing heat responsive characteristics, a certain degree of modification of said signal will produce an output of said measuring means compatible with the output of said unit under test.

2. Apparatus as in claim 1 wherein said signal modifying means comprises an adjustable resistance connected in shunt across an electrical line coupling said signal generating means and said measuring means.

3. Apparatus for testing a heat responsive unit comprising, means defining a chamber for receiving thereinto the unit to be tested, means for imparting heat to said chamber defining means for heating the unit therein, means thermally coupled with said chamber defining means for generating an electrical signal a characteristic of which is a function of the temperature of said chamber defining means, the signal generating means being a thermocouple junction in thermal contact with said chamber defining means, means coupled to said signal generating means for measuring said signal, the last mentioned means including means for selectively modifying the magnitude of said signal as received into said measuring means, the arrangement being such that for respective units under test of differing heat responsive characteristics, a certain degree of modification of said signal will produce an output of said measuring means compatible with the output of said unit under test.

4. Apparatus as in claim 3 wherein the chamber defining means is an elongated heat conductive member open at one end for insertion of said unit thereinto, and the thermocouple junction is located at a point remote from said open end.

References Cited in the file of this patent

UNITED STATES PATENTS

| | | |
|---|---|---|
| 1,375,872 | Varley | Apr. 26, 1921 |
| 2,854,844 | Howell | Oct. 7, 1958 |